US008503369B2

United States Patent
Mizukoshi

(10) Patent No.: US 8,503,369 B2
(45) Date of Patent: *Aug. 6, 2013

(54) CELLULAR PHONE TERMINAL HAVING BUILT-IN WIRELESS LAN, CELLULAR PHONE SYSTEM AND PERSONAL INFORMATION PROTECTION METHOD THEREFOR

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,331

(22) Filed: May 2, 2012

(65) Prior Publication Data

US 2012/0258688 A1    Oct. 11, 2012

Related U.S. Application Data

(63) Continuation of application No. 11/496,181, filed on Jul. 31, 2006, now Pat. No. 8,194,586.

(30) Foreign Application Priority Data

Aug. 1, 2005 (JP) ................................ 2005-222355

(51) Int. Cl.
*H04W 4/00* (2009.01)
(52) U.S. Cl.
USPC .......... 370/328; 370/338; 455/41; 455/552.1; 380/247; 380/248; 726/27; 713/162; 713/190
(58) Field of Classification Search
USPC ...... 370/328, 338; 455/410, 552.1; 380/247, 380/248; 726/27; 713/162, 190
See application file for complete search history.

(56) References Cited

U.S. PATENT DOCUMENTS 6,567,396 B1   5/2003 Pohjanvouri et al.
6,609,152 B1   8/2003 Ono (Continued)

FOREIGN PATENT DOCUMENTS

EP   1 379 029 A1   1/2004
JP   2003-069626   3/2003

(Continued)

OTHER PUBLICATIONS

European Search Report dated Dec. 1, 2006.

(Continued)

*Primary Examiner* — Allahyar Kasraian
(74) *Attorney, Agent, or Firm* — Scully, Scott, Murphy & Presser, P.C.

(57) ABSTRACT

Disclosed are a cellular phone terminal, a cellular phone system and a privacy protection method therefor that enable to prevent leakage of private information from the communication data when conducting a search for wireless LAN base stations. The cellular phone terminal comprises, in addition to the cellular phone function section, a cellular phone network transmitter/receiver section, a wireless LAN transmitter/receiver section and a wireless LAN connection control section, an SSID•MAC address management section connected to the wireless LAN connection control section and the cellular phone network transmitter/receiver section. The SSID•MAC address management section is allocated by a MAC address management server one or more temporary MAC addresses together with their time limit by way of the cellular phone network transmitter/receiver section and a cellular phone base station and the temporary MAC addresses are used when conducting a search for wireless LAN base stations.

10 Claims, 6 Drawing Sheets

(56) References Cited

U.S. PATENT DOCUMENTS

| | | | |
|---|---|---|---|
| 7,046,666 B1 | 5/2006 | Bollay et al. | |
| 7,346,708 B2 | 3/2008 | Minamisawa | |
| 7,702,329 B1 | 4/2010 | Durig et al. | |
| 7,706,539 B2 | 4/2010 | Jang et al. | |
| 8,086,855 B2* | 12/2011 | Katz et al. | 713/170 |
| 2003/0039260 A1 | 2/2003 | Fujisawa | |
| 2003/0177267 A1 | 9/2003 | Orava et al. | |
| 2004/0014475 A1 | 1/2004 | Saito et al. | |
| 2004/0057408 A1 | 3/2004 | Gray | |
| 2004/0260805 A1* | 12/2004 | Aoyama et al. | 709/224 |
| 2004/0266424 A1 | 12/2004 | Park et al. | |
| 2005/0021786 A1 | 1/2005 | Kikkawa et al. | |
| 2005/0232209 A1* | 10/2005 | Buckley et al. | 370/338 |
| 2005/0243819 A1 | 11/2005 | Peng et al. | |
| 2006/0013170 A1* | 1/2006 | Shin et al. | 370/338 |
| 2006/0120317 A1 | 6/2006 | Zheng | |
| 2007/0211653 A1 | 9/2007 | Mizukoshi | |
| 2007/0226502 A1* | 9/2007 | Tenny | 713/170 |

FOREIGN PATENT DOCUMENTS

| | | |
|---|---|---|
| JP | 2003-234795 | 8/2003 |
| JP | 2004-040806 | 2/2004 |
| JP | 2004-96377 A | 3/2004 |
| JP | 2004-349807 A | 12/2004 |
| JP | 2005-18781 A | 1/2005 |
| JP | 2005-64572 | 3/2005 |
| WO | WO 03/061203 A1 | 7/2003 |

OTHER PUBLICATIONS

Official Action dated Aug. 24, 2010 received from the Japanese Patent Office from related Japanese Application No. 2005-222355, together with a partial English-language translation.
Official Action dated Jul. 19, 2011 received from the Japanese Patent Office from related Japanese Application No. 2005-222355, together with a partial English-language translation.
U.S. Office Action dated Sep. 17, 2009.
U.S. Office Action dated Mar. 29, 2010.
U.S. Office Action dated Oct. 5, 2010.
U.S. Office Action dated Mar. 15, 2011.

* cited by examiner

PRIOR ART

CELLULAR PHONE TERMINAL HAVING BUILT-IN WIRELESS LAN, CELLULAR PHONE SYSTEM AND PERSONAL INFORMATION PROTECTION METHOD THEREFOR

CROSS REFERENCE TO RELATED APPLICATION

The present application is a continuation application of U.S. Ser. No. 11/496,181 filed on Jul. 31, 2006 and claims the benefit of priority from Japanese Patent Application No. 2005-222355, filed on Aug. 1, 2005, the entire disclosures of each of which are incorporated herein by reference.

FIELD OF INVENTION

The present invention relates to a cellular phone terminal, a cellular phone system and a personal information (privacy) protection method therefor, more specifically to a cellular phone terminal having built-in wireless LAN (Local Area Network), a cellular phone system and a privacy protection method therefor.

BACKGROUND OF THE INVENTION

Portable communication terminals such as PHS (Personal Handy-phone System), PDA (Personal Digital Assistant) and the like are popularized as communication means. Such portable communication terminals (refereed to as cellular phones below) are connected to a communication network such as a public telephone network by way of the nearest one of a plurality of wireless base stations, each having a relatively narrow service area for enabling a terminal to be connected to another communication device such as a cellular hone, a stationary telephone, a PC (personal computer), etc. Such cellular phones are increasingly multi-function and high performance.

On the other hand, PCs are also popularized and undergo multi-function and high performance at a fast speed. For example, PCs having built-in wireless LAN have been developed. Due to cheaper operation cost, faster communication rate and convenience of wireless LAN, PCs having built-in wireless LAN are also rapidly popularized as data terminals or communication terminals.

Conventional cellular phone technologies as described hereinabove are disclosed in various technical documents. A communication system, a communication method and a communication control device for enabling to communicate between communication terminals by way of communication control devices that are interconnected through a network are disclosed (see, for example, Japanese patent publication no. 2003-69626). And a protocol conversion communication method that temporarily allocates a MAC (Media Access Control) address to a PPP (Point-to-point Protocol) session and releases such MAC address at the release of the session and a relay unit having such conversion function are disclosed (see, for example, Japanese patent publication no. 2003-234795). Moreover, a user confidentiality guarantee method that generates temporary addresses from a MAC address for selecting a particular one of the temporary addresses and a wireless LAN system therefor are disclosed (see, for example, Japanese patent publication no. 2004-40806).

FIG. 5 is a block diagram for illustrating the basic construction of the conventional cellular phone having built-in wireless LAN. In FIG. 5, the cellular phone having built-in wireless LAN 50 comprises a cellular phone function section 51, a wireless LAN connection (or link) control section 52, a wireless LAN transmitter/receiver section 53 and a cellular phone network transmitter/receiver section 54.

Now, describing the construction of these constituent elements more in detail, the cellular phone function section 51 includes such functions as voice communication, TV phone, E-mail, WEB browser and the like. The wireless LAN connection control section 52 is connected to the wireless LAN transmitter/receiver section 53. The wireless LAN transmitter/receiver section 53 and the cellular phone network transmitter/receiver section 54 are also connected to the cellular phone function section 51. The wireless LAN transmitter/receiver section 53 is connected to the wireless LAN base station 61a or 61b and then to a communicating terminal, server or the like by way of internet 62. On the other hand, the cellular phone network transmitter/receiver section 54 is connected to a communicating terminal, server or the like by way of the nearby cellular phone base station 63 and the cellular phone network 64.

The cellular phone 50 having the construction as described hereinabove is believed to be easily connected to the wireless LAN base station 61 by its user unlike a notebook PC. Even if it is not connected, a search for nearby wireless base stations 61 is conducted periodically in order to confirm if the wireless LAN is available.

Now, FIG. 6 is a sequence diagram to illustrate communication steps (or protocol) between the conventional cellular phone having built-in wireless LAN 50 and the wireless LAN base station 61 or the like as shown in FIG. 5. Firstly, the wireless LAN connection control section 52 of the cellular phone 50 requests search/connection to the wireless LAN transmitter/receiver section 53 (step A1). In response thereto, the wireless LAN transmitter/receiver section 53 sends a search request/data transmission to the nearby wireless LAN base station 61a (step A2). The wireless LAN base station 61a, then, returns search response/data transmission to the wireless LAN transmitter/receiver section 53 (step A3). Upon detecting disconnection from the wireless LAN base station 61a, the wireless LAN transmitter/receiver section 53 sends the disconnection detection to the wireless LAN connection control section 52 (step A4).

Then, assuming that the cellular phone 50 moves, the wireless LAN connection control section 52 of the cellular phone 50 sends search/connection to the wireless transmitter/receiver section 53 (step A5). Then, the wireless LAN transmitter/receiver section 53 sends search request/data transmission to another wireless LAN base station 61b (step A6). The wireless LAN base station 61b sends search response/data transmission to the wireless LAN transmitter/receiver section 53 of the cellular phone 50 (step A7) and the wireless LAN transmitter/receiver section 53 sends disconnection detection to the wireless LAN connection control section 52 (step A8). If the cellular phone 50 moves again, the search/connection (step A9), the search request/data transmission (step A10) and the search response/data transmission (step A11) will be performed in the similar manner as described hereinabove.

As illustrated in FIG. 6, the wireless LAN transmitter/receiver section 53 also performs search request/data transmission to a false base station or an observer 60. This means that the false base station or the observer 60 is able to acquire sender's addresses by performing pinpoint observation or relativity tracking.

Since wireless LAN devices are less expensive, communication monitors are also available at a low cost. Although a wireless LAN communicates by using its proper MAC address, such MAC address cannot be encrypted because it is contained in the header portion of the data. Even if it is not connected to the wireless LAN base station 61, a control packet is transmitted only for the purpose of conducting a search if there is any wireless LAN base station in the surroundings. Such packet enables one to observe the proper MAC address of the cellular phone 50 by using a communication monitor. Since wireless LAN devices are less expensive, it is also easy to operate a wireless LAN base station having no restriction in connection. If connection is made to a wireless LAN base station (for example, the false base station 60), the owner of the wireless LAN base station is able to easily identify the MAC address. This means that privacy (private information) may be acquired or leaked.

As described hereinabove, it is possible to monitor the place of the user of the cellular phone 50 at a certain time by monitoring the MAC address of the wireless LAN built in his/her cellular phone, thereby making it difficult to protect the user's privacy. As a solution to this problem, it is possible to randomly change the MAC address so that the user of the cellular phone cannot be identified. However, there is a possibility that the MAC address collides with one of another user in the same or near area, thereby causing impaired communication or unintentional communication hijacking. Although it is also possible to make arbitration of MAC addresses among nearby users in advance, such approach is useless if users having the same MAC address move close to each other while in communication.

Moreover, in public wireless LAN, a certification method that does not depend on MAC address has been proposed and is in practical use. However, such method poses another problem to lose compatibility with the existing wireless LAN system that uses terminals' MAC addresses for restriction.

SUMMARY OF THE INVENTION

The present invention has been made in light of the aforementioned problems associated with prior are and it is therefore an object of the present invention to provide a cellular phone having built-in wireless LAN, a cellular phone system and a privacy protection method therefor that are capable of overcoming or alleviating such problems.

In order to solve the aforementioned problems, the cellular phone terminal having built-in wireless LAN, the cellular phone system and privacy protection method therefor according to the present invention employ the following characteristic constructions.

(1) A cellular phone terminal having built-in wireless LAN comprises a cellular phone network transmitter/receiver section for enabling to communicate with another terminal in the cellular phone network by way of a cellular phone base station, a wireless LAN transmitter/receiver section for enabling to be connected to internet or the like by way of wireless LAN base stations, and an SSID/MAC address management section connected to a wireless LAN connection control section for controlling the connection of the wireless LAN transmitter/receiver section and the cellular phone network transmitter/receiver section, whereby making management of SSID•MAC addresses.

(2) A cellular phone terminal having built-in wireless LAN of the above (1), wherein the SSID•MAC address management section holds and manages one or more temporary MAC addresses that are usable temporarily and the wireless LAN connection control section is able to acquire the temporary MAC address.

(3) A cellular phone terminal having built-in wireless LAN of the above (2), wherein the temporary MAC address has predetermined time limit and is deleted after lapse of the time limit.

(4) A cellular phone terminal having built-in wireless LAN of the above (2), wherein the SSID•MAC address management section includes the temporary MAC addresses as well as proper MAC addresses.

(5) A cellular phone system comprising a cellular phone terminal having built-in wireless LAN, a cellular phone network to be connected to a cellular phone network transmitter/receiver section of the cellular phone terminal having built-in wireless LAN by way of a cellular phone base station, and a network such as internet or the like to be connected to a wireless LAN transmitter/receiver of the cellular phone terminal having built-in wireless LAN by way of a wireless LAN base station, characterized in that the cellular phone terminal having built-in wireless LAN comprises a wireless LAN connection control section for making connection control of the wireless LAN transmitter/receiver section and an SSID•MAC address management section connected to the cellular phone network transmitter/receiver section for managing SSID•MAC addresses, and that the cellular phone network is provided with a MAC address management server for allocating one or more temporary MAC addresses to the SSID•MAC address management section.

(6) A cellular phone system of the above (5), wherein the MAC address management server includes a MAC address management list for managing temporary MAC addresses allocated in response to the telephone number of the cellular phone terminal having built-in wireless LAN.

(7) A cellular phone system of the above (5), wherein each of the temporary MAC addresses has predetermined time limit and is deleted after lapse of the time limit.

(8) In a privacy protection method of a cellular phone terminal having built-in wireless LAN comprising a cellular phone network transmitter/receiver section and a wireless LAN transmitter/receiver section for enabling to communicate with another terminal by way of the cellular phone network transmitter/receiver section and a cellular phone base station and also capable of communicating by way of the wireless LAN transmitter/receiver section and a wireless LAN base station, the cellular phone terminal comprises the steps of acquiring a temporary usable MAC address from a MAC address management server provided with a cellular phone network that is capable of communicating by way of the cellular phone base station; managing the acquired MAC address as well as its time limit; and conducting a search for the wireless LAN base station using the acquired temporary MAC address.

(9) A privacy protection method of a cellular phone terminal having built-in wireless LAN of the above (8), wherein the MAC address management server allocates one or more temporary MAC addresses together with their time limit to the cellular phone terminal, and each of the temporary MAC addresses is deleted after lapse of the time limit.

(10) A privacy protection method of a cellular phone terminal having built-in wireless LAN of the above (8), wherein the cellular phone terminal having built-in wireless LAN changes the temporary MAC address to another temporary MAC address when conducting a search for the wireless LAN base station.

(11) A privacy protection method of a cellular phone terminal having built-in wireless LAN of the above (10), wherein the change of the temporary MAC address is carried out at disconnection of the wireless LAN link or after lapse of the predetermined time.

(12) A program for enabling a computer to protect privacy of users of a cellular phone terminal having built-in wireless LAN including a wireless LAN transmitter/receiver section and a cellular phone network transmitter/receiver section when communicating with other terminals, respectively, by way of wireless LAN base stations and cellular phone network base stations, comprising: a function for acquiring a temporarily usable MAC address from a MAC address management server furnished with a cellular phone network by way of the cellular phone base stations; a function for managing the acquired MAC address together with the time limit; and a function for conducting a search for nearby wireless LAN base stations by using the acquired temporary MAC address.

(13) A recording medium for recording the program of the above (12) in such a manner that the computer is executable.

The cellular phone having built-in wireless LAN, the cellular phone system and the privacy protection method therefor according to the present invention exhibit significant practical advantages as follows: It is possible to protect privacy of the user of the cellular phone having built-in wireless LAN from administrators of the wireless LAN base stations that provide services with goodwill for permitting connection to anybody, any ill-willed person who provides a false wireless LAN base station, or any person who monitors the wireless LAN. Also, it is possible to maintain compatibility with existing less expensive wireless LAN devices. Since they are able to cope with conventional connection certification system using MAC addresses, they do not lose convenience of the existing system. Since MAC addresses are under control of a MAC address management server in the cellular phone network, there is no possibility of causing MAC address collision. It is also possible to safely allocate MAC addresses because temporary MAC addresses are allocated by way of the cellular phone network. Moreover, since a plurality of MAC addresses can be allocated, wireless LAN can be used even in areas where no connection can be made to the cellular phone network.

In other words, since the cellular phone terminal changes the sender's MAC address according to the present invention, the link level address of the wireless LAN can be changed at the moved location, thereby hiding wireless communication condition of the cellular phone terminal. Additionally, since the MAC address at the time when the cellular phone terminal performs wireless LAN communication is converted and the MAC address is allocated by the MAC address management server at the cellular phone network side, it is possible to apply to the existing wireless LAN communication and certification system such as the 802.1x or the like can be performed, thereby hiding cellular phone terminals even if the wireless LAN is monitored. Moreover, according to the present invention, since a temporary MAC address is allocated by the MAC address management server prior to connection to a wireless connection node, it is possible to change MAC addresses of all wireless LAN packets, thereby hiding cellular phone terminals and enabling to apply to existing wireless LAN access points.

BRIEF DESCRIPTION OF THE DRAWINGS

In the accompanying drawings.

DESCRIPTION OF PREFERRED EMBODIMENTS

Now, construction and operation of preferred embodiments of the cellular phone terminal having built-in wireless LAN, the cellular phone system and the privacy protection method therefor according to the present invention will be described in detail with reference to the accompanying drawings.

Figure 1:
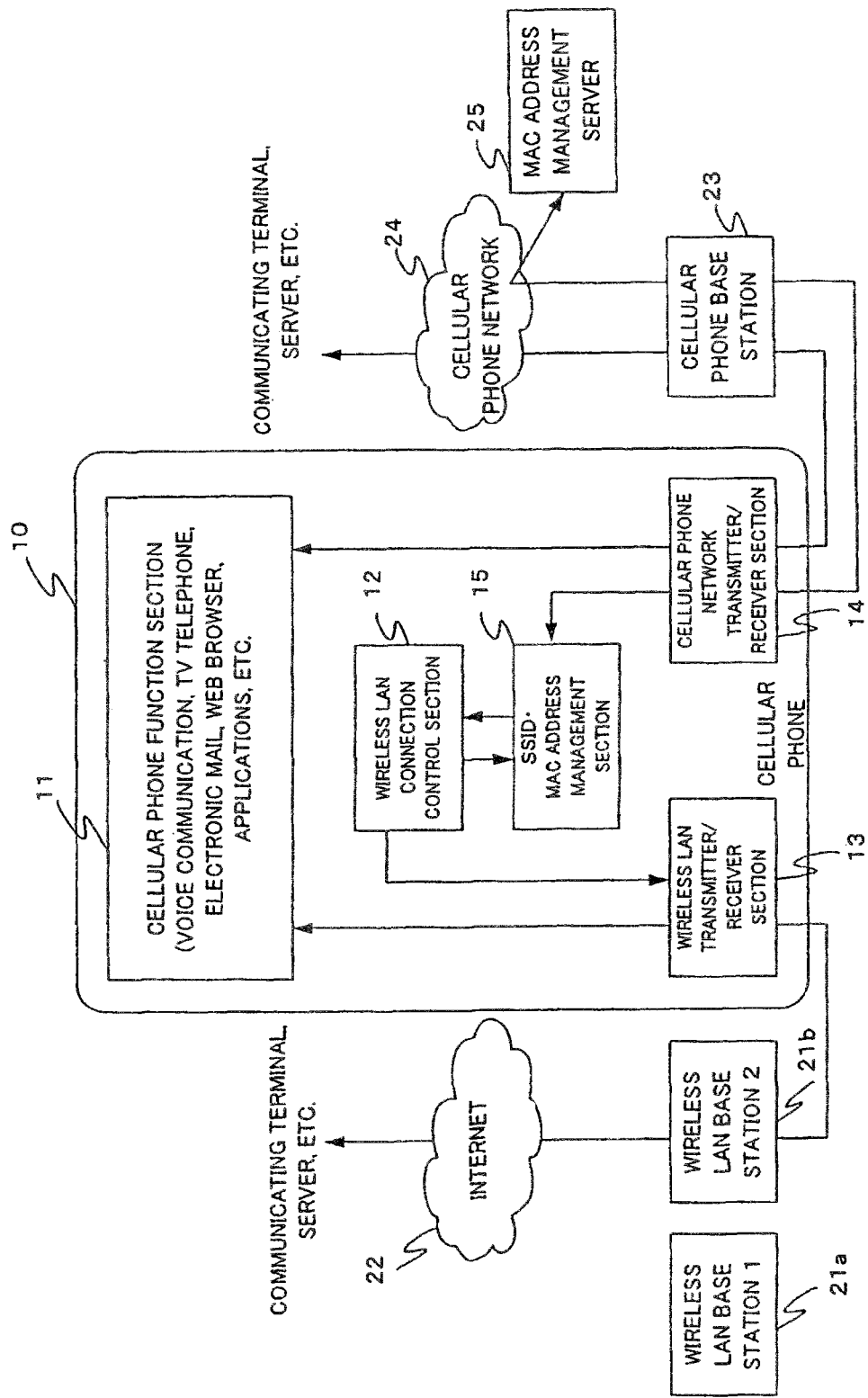
FIG. 1 is a functional block diagram of a preferred embodiment of the cellular phone apparatus according to the present invention.

Firstly, FIG. 1 is a functional block diagram to illustrate the entire construction of a preferred embodiment of the cellular phone system according to the present invention. In this particular cellular phone system, the cellular phone terminal having built-in wireless LAN (simply referred to as a cellular phone below) 10 comprises a cellular phone function section 11, a cellular phone network transmitter/receiver section 14, a wireless LAN transmitter/receiver section 13, a wireless LAN connection control section 12 and an SSID•MAC address management section 15.

In addition to the cellular phone 10, the cellular phone system includes a plurality of wireless LAN base stations 21a, 21b that are connected to the wireless LAN transmitter/receiver section 13, and a network 22 such as interne or the like. It further includes a cellular phone base station 23, a cellular phone network 24 that are connected to the cellular phone network transmitter/receiver section 14, and a MAC address management server 25 that is connected to the cellular phone network 24. And the SSID•MAC address management section 15 of the cellular phone 10 is connected to the wireless LAN connection control section 12 and the cellular phone network transmitter/receiver section 14.

Figure 2:
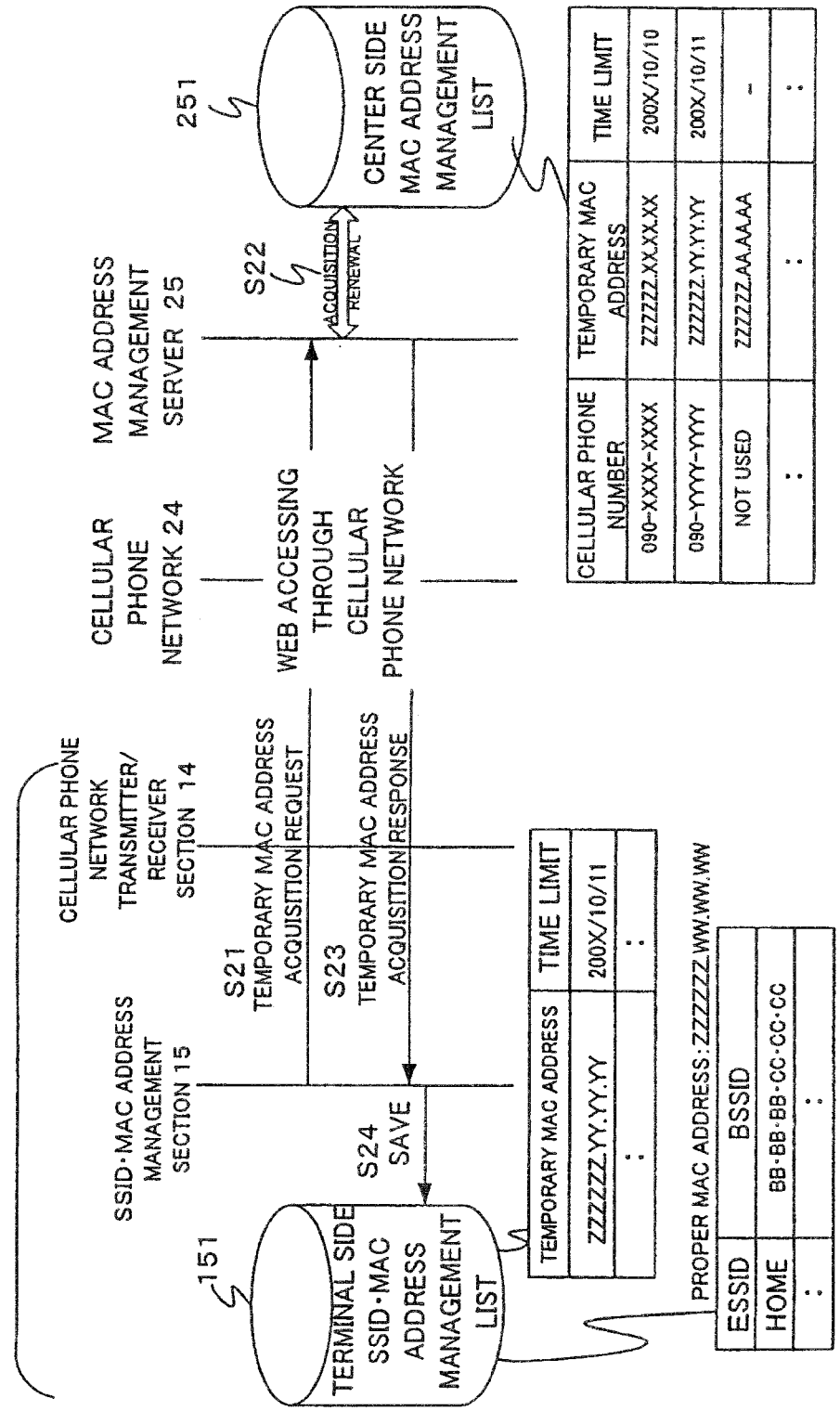
FIG. 2 is a sequence diagram to illustrate the temporary MAC address acquisition operation in the cellular phone apparatus as shown in FIG. 1.

Now, reference is made to a sequence diagram in FIG. 2 for illustrating the operation of the cellular phone system according to the present invention as shown in FIG. 1. FIG. 2 is the sequence diagram to illustrate temporary MAC address acquisition process in the cellular phone system according to the present invention. That is, it illustrates the temporary MAC address acquisition operation among the cellular phone network transmitter/receiver section 14 and the SSID•MAC address management section 15 in the cellular phone 10, the cellular phone network 24 and the MAC address management server 25.

Firstly, the SSID•MAC address management section 15 sends to the MAC address management server 25 an acquisition request for temporarily available MAC address using a WEB accessing method by the cellular phone network communication that is furnished with the cellular phone 10. Then, the MAC address management server 25 receives the temporary MAC address acquisition request (step S21). The cellular phone number is acquired in response to the acquisition request. The MAC address administration server 25 refers to a center side MAC address management list 251 for renewing the management list by allocating one or more suitable temporary MAC addresses for the cellular phone number and the time limit (step S22). It is to be noted that, as illustrated in FIG. 2, the center side MAC address management list 251 manages the temporary MAC addresses allocated to the cellular phone number and the time limit as an integral part.

The SSID•MAC address management section 15 of the cellular phone 10 acquires the temporary MAC addresses and the time limit in the response from the MAC address management server 25 (step S23). They are, then, saved in the terminal side SSID•MAC address management list 151 (step S24). It is to be noted, as exemplified in FIG. 2, that the terminal side SSID•MAC address management list 151 includes a fixed MAC address as selected in advance for each user of the cellular phone 10 together with a plurality of allocated temporary MAC addresses and their time limit. On the other hand, the connection from the cellular phone 10 to the MAC address management server 25 may be encrypted by SSL (Secure Socket Layer).

Any temporary MAC address whose time limit has expired is excluded from the SSID•MAC address management section 15 of the cellular phone 10. Simultaneously, the MAC address management server 25 excludes them from the center side MAC address management list 251. Because of some time difference between the cellular phone 10 and the server, management by the cellular phone 10 may be made based on the time difference from the response acquisition time. The terminal (or the cellular phone) side SSID•MAC address management list 151 also holds an SSID management list for making connection by using the MAC address proper to each cellular phone. The SSID management list includes ESSID and BSSID for specifying the wireless LAN base station 21 that are set in advance by the user. It is to be noted in allocating the MAC address in the MAC address management server 25 that allocation having no correlation should be made so that the cellular phone 10 cannot be identified.

Figure 3:
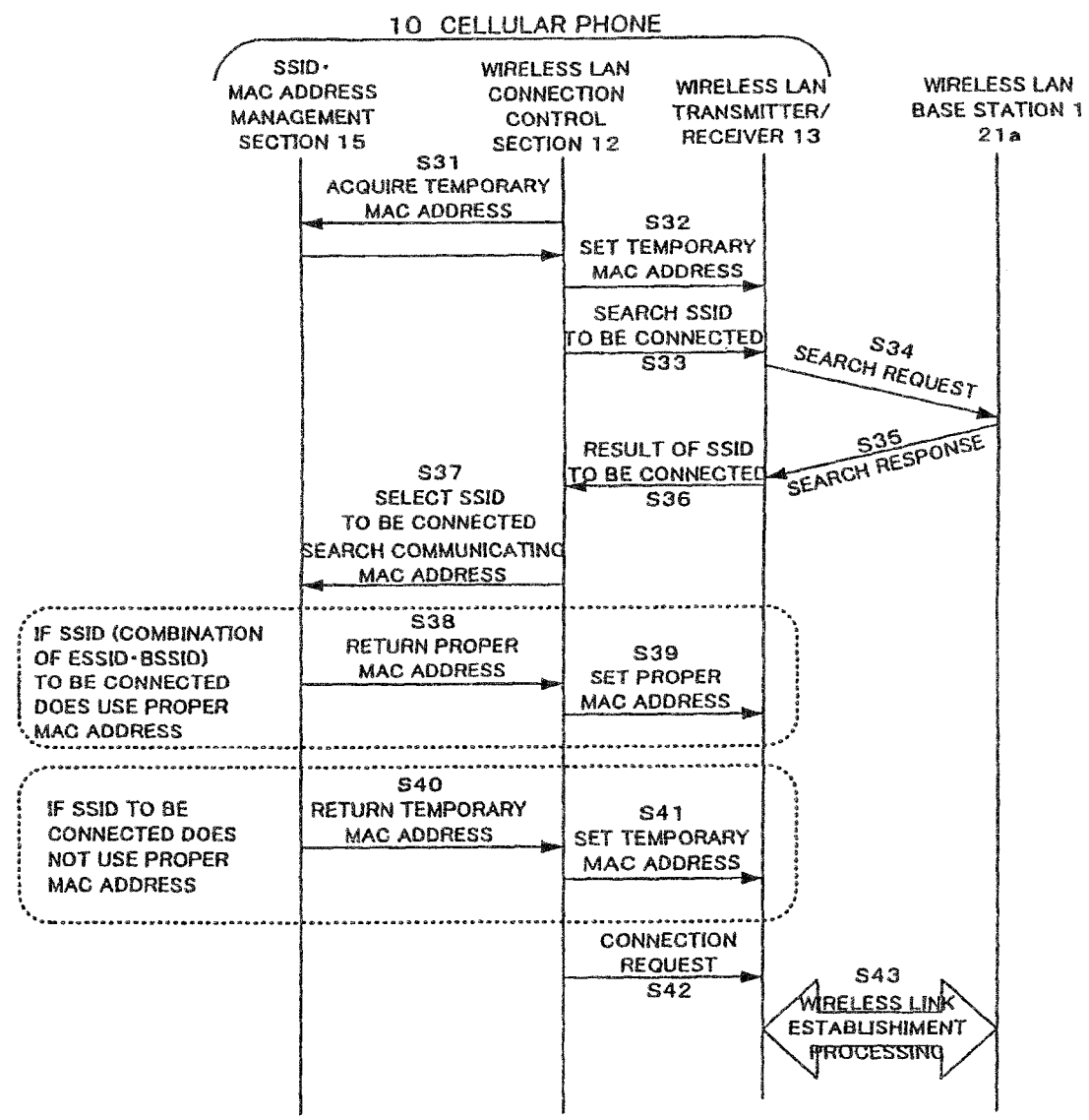
FIG. 3 is a sequence diagram to illustrate the MAC address selection operation in the cellular phone apparatus as shown in FIG. 1.

Now, reference is made to a sequence diagram in FIG. 3 for describing the MAC address selection process. FIG. 3 illustrates the MAC address processing operation of the cellular phone 10, particularly between the SSID•MAC address management section 15, the wireless LAN connection control section 12 and the wireless LAN transmitter/receiver section 13 of the cellular phone 10 and the wireless LAN base station 21*a*.

Prior to conducting a search for nearby (or surrounding) wireless LAN base stations 21, the wireless LAN connection control section 12 of the cellular phone 10 firstly acquires temporary MAC addresses from the SSID•MAC address management section 15 (step S31). If there is no temporary MAC address whose time limit is not expired, an inquiry is made to the MAC address management server 25 for acquiring new temporary MAC addresses.

Subsequently, a temporary MAC address is set to the wireless LAN transmitter/receiver section 13 (step S32) and conducts a search for the SSID to be connected (step S33). Then, the wireless LAN transmitter/receiver section 13 conducts a search for nearby wireless LAN base stations 21 by using the acquired temporary MAC address (step S34).

Upon receiving a response from the wireless LAN base station 21*a* (step S35), the wireless LAN transmitter/receiver section 13 returns the search result of the SSID to be connected to the wireless LAN connection control section 12 (step S36). The wireless LAN connection control section 12 selects the SSID to be connected based on the priority or the like set in advance and sends an inquiry to the SSID•MAC address management section 15 about the MAC address by which the communication is to be made by way of the wireless LAN base station 21 having the selected SSID (step S37).

In case when the SSID to be connected uses the proper MAC address, the proper MAC address that is set at the time of purchase of the cellular phone is returned (steps S38 and S39). On the other hand, in case when the SSID to be connected does not use the proper MAC address, the temporary MAC address is returned (steps S40 and S41). In case when a plurality of temporary MAC addresses whose time limit are not expired are held, the way of selecting temporary MAC address is not restricted herein.

The wireless LAN connection control section 12 sets the acquired MAC address to the wireless LAN transmitter/receiver section 13. The wireless LAN connection control section 12 sends a connection request to the wireless LAN transmitter/receiver section 13 (step S42). The connection processing (or wireless link establishment processing) between the cellular phone 10 and the wireless LAN base station 21 is carried out and the cellular phone 10 is enabled to perform wireless LAN communication by way of the wireless LAN base station 21*a* (step S43).

Now, a description will be made on the operation to change MAC addresses when the cellular phone 10 moves from one place to another. When the cellular phone moves, an inquiry is made if the wireless LAN is usable at the moved location by using the temporary MAC address. In case when the wireless LAN link has been disconnected after performing communication by connecting to a certain wireless LAN base station 21, the temporary MAC address will be changed to another temporary MAC address. Even if conducting only a search for nearby wireless LAN base stations, the temporary MAC address is changed to another temporary MAC address after lapse of a given time.

Figure 4:
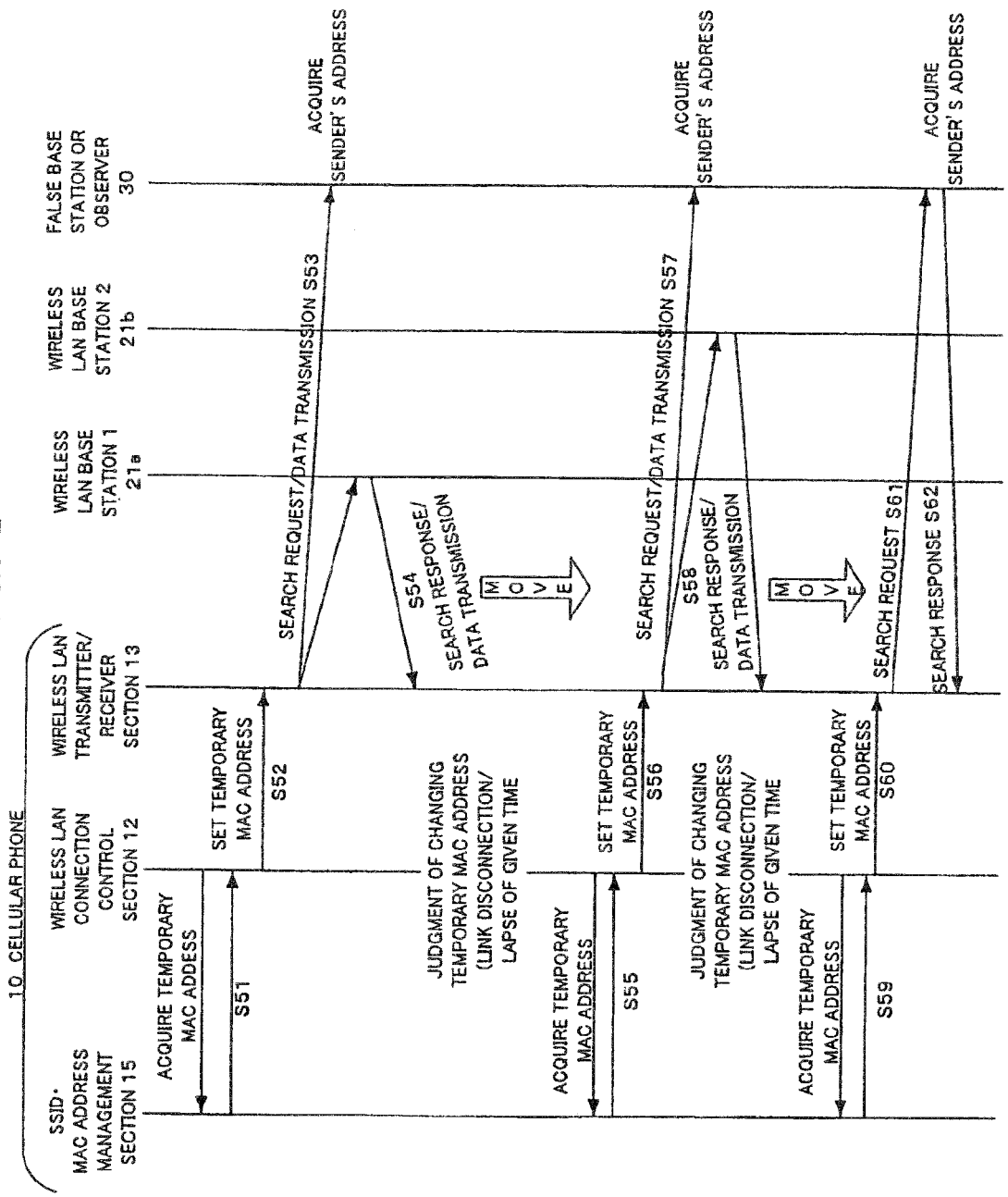
FIG. 4 is a sequence diagram to illustrate the MAC address changing operation when the cellular phone apparatus in FIG. 1 moves.
Figure 5:
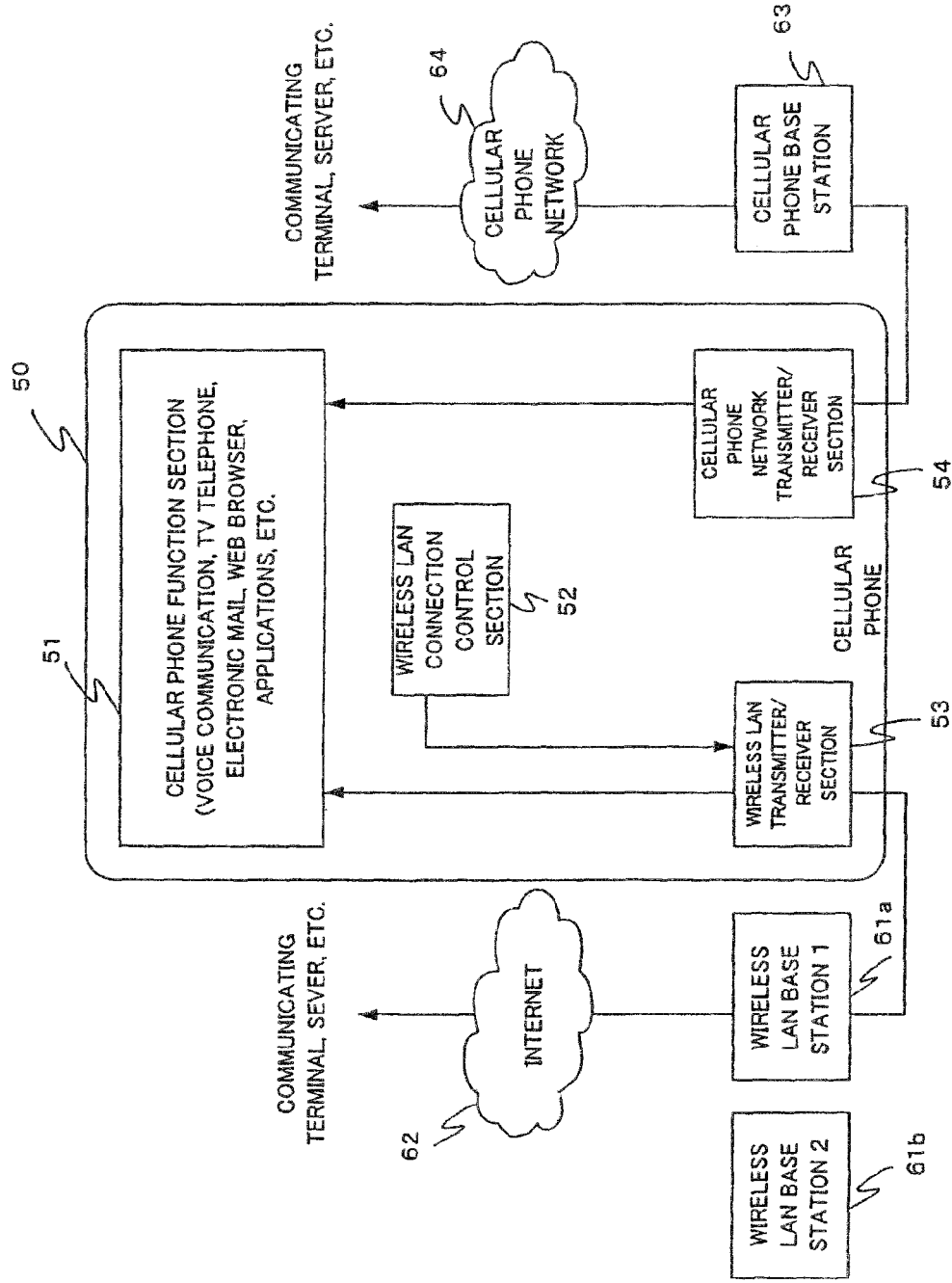
FIG. 5 is a functional block diagram of a conventional cellular phone having built-in wireless LAN.
Figure 6:
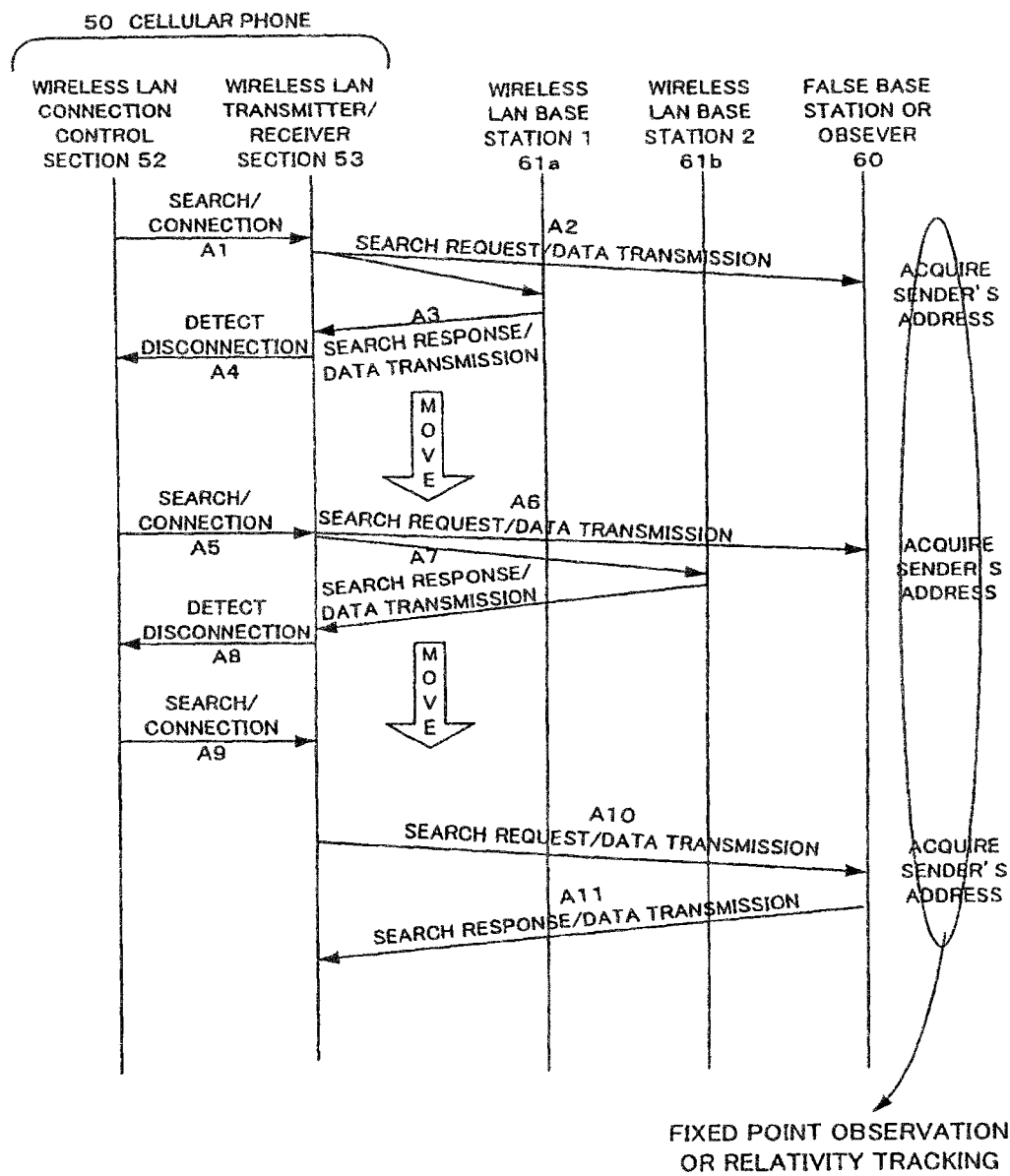
FIG. 6 is a sequence diagram to illustrate the operation of the cellular phone having built-in wireless LAN as shown in FIG. 5.

More detailed description will be made with reference to a sequence diagram in FIG. 4. As described hereinabove, the temporary MAC address is acquired between the SSID•MAC address management section 15 and the wireless LAN connection control section 12 of the cellular phone 10 (step S51). The wireless LAN connection control section 12 sets the temporary MAC address to the wireless LAN transmitter/receiver section 13 (step S52). Then, the wireless LAN transmitter/receiver section 13 sends search request/data transmission to the nearby wireless LAN base station (for example, the wireless LAN base station 21*a*) (step S53) and receives the search response/data transmission (step S54).

If the cellular phone 10 moves, the temporary MAC address acquisition (step S59) and MAC address setting (step S60) will be carried out as described hereinabove for the purpose of making judgment of changing the temporary MAC address (link disconnection/lapse of a given time). Then, the wireless LAN transmitter/receiver section 13 sends a search request/data transmission to, for example, the wireless LAN base station 21*b* (step S57) and receives a search response/data transmission from the wireless LAN base station 21*b* (step S58).

When the cellular phone 10 moves again, the temporary MAC address acquisition (step S59) and the temporary MAC address setting (step S60) will be performed as described hereinabove for the purpose of making judgment of changing the temporary MAC address (link disconnection/lapse of a given time). Then, the wireless LAN transmitter/receiver section 13 sends a search request to the false base station or the observer 30 (step S61) and receives a search response (step S62).

However, it is to be noted that even if the false base station or the observer 30 may receive the search request/data transmission and acquire the address of the transmitter from the wireless LAN transmitter/receiver section 13 of the cellular phone 10 at every step of movement of the cellular phone 10, the acquired MAC address of the transmitter is a temporary MAC address and not the same MAC address, thereby effectively eliminating possibility of leaking privacy (or private information) of the user of the cellular phone 10.

The construction and the operation of preferred embodiments of the cellular phone terminal having built-in wireless LAN, the cellular phone terminal and the privacy protection method therefor according to the present invention have been described in detail hereinabove. However, such embodiments are only for the purpose of illustrating the present invention rather than restricting the present invention. It is, therefore, easily understood that a person having an ordinary skill in the art can make various changes and modifications suitable for particular applications without departing from the spirit and the scope of the present invention as set forth in the appended claims. For example, connection from the cellular phone to the MAC address management server should not be restricted to the WEB access method in the cellular phone communication. It is possible to include in the control signals for the cellular phone network. Moreover, the identifier for enabling the MAC address management server to identify terminals (cellular phones) should not be restricted to cellular phone numbers but may be other subscriber identification numbers for SIM cards or the like. In case of replacing users' SIM cards, the terminal side temporary MAC address management list may be initialized and before inquiring to the MAC address management server.

What is claimed is:

1. A cellular phone terminal having built-in wireless LAN comprising:
   a cellular phone network transmitter/receiver section for enabling communication with another terminal in a cellular phone network by way of a cellular phone base station, and
   a management section connected to a wireless LAN connection control section for controlling connection of a wireless LAN transmitter/receiver section and the cellular phone network transmitter/receiver section,
   wherein the management section sends an acquisition request for acquiring one or more temporarily usable MAC addresses managed by a MAC address management server, and acquires the one or more temporarily usable MAC addresses through the cellular phone network.

2. The cellular phone terminal having built-in wireless LAN of claim 1, wherein the management section sends the acquisition request for acquiring the one or more temporarily usable MAC addresses using WEB accessing method in the cellular phone network communication.

3. The cellular phone terminal having built-in wireless LAN of claim 1, further comprising:
   an SSID/MAC address management section for managing the one or more temporarily usable MAC addresses.

4. The cellular phone terminal having built-in wireless LAN of claim 3, wherein the acquired one or more temporarily usable MAC addresses are stored in a management list in the cellular phone terminal.

5. The cellular phone terminal having built-in wireless LAN of claim 4, wherein SSID/MAC address management section further acquires a corresponding time limit for each of the one or more temporarily usable MAC addresses, respectively.

6. The cellular phone terminal having built-in wireless LAN of claim 5, wherein the managing comprises deleting the one or more temporarily usable MAC addresses when the corresponding time limit expires.

7. The cellular phone terminal having built-in wireless LAN of claim 1, wherein the acquisition request and acquisition of the one or more temporarily usable MAC addresses are encrypted.

8. A cellular phone system comprising:
   a cellular phone terminal having built-in wireless LAN,
   a cellular phone network to be connected to a cellular phone network transmitter/receiver section of the cellular phone terminal having built-in wireless LAN by way of a cellular phone base station, and
   a network to be connected to a wireless LAN transmitter/receiver of the cellular phone terminal having built-in wireless LAN by way of a wireless LAN base station,
   wherein the cellular phone terminal having the built-in wireless LAN comprises a management section that sends an acquisition request for acquiring one or more temporarily usable MAC addresses managed by a MAC address management server, and acquires the one or more temporarily usable MAC addresses through the cellular phone network.

9. The cellular phone system of claim 8,
   wherein the management section sends the acquisition request for acquiring the one or more temporarily usable MAC addresses using a WEB accessing method in the cellular phone network communication.

10. A method of privacy protection for a cellular phone terminal having built-in wireless LAN comprising a cellular phone network transmitter/receiver section for enabling communication with another terminal in a cellular phone network by way of a cellular phone base station, and a management section connected to a wireless LAN connection control section for controlling connection of a wireless LAN transmitter/receiver section and the cellular phone network transmitter/receiver section, the method comprising:
   sending an acquisition request for acquiring one or more temporarily usable MAC addresses managed by a MAC address management server and
   acquiring the one or more temporarily usable MAC addresses through the cellular phone network.

* * * * *